United States Patent [19]

Yanabu et al.

[11] Patent Number: 4,841,538
[45] Date of Patent: Jun. 20, 1989

[54] CO₂ GAS LASER DEVICE

[75] Inventors: Satoru Yanabu, Machida; Hideomi Takahashi, Tokyo; Eiji Kaneko; Koichi Yasuoka, both of Yokohama, all of Japan

[73] Assignee: Kabushiki Kaisha Toshiba, Kawasaki, Japan

[21] Appl. No.: 270,376

[22] Filed: Nov. 10, 1988

Related U.S. Application Data

[63] Continuation of Ser. No. 21,850, Mar. 4, 1987.

[30] Foreign Application Priority Data

Mar. 5, 1986 [JP] Japan ................ 61-31788[U]

[51] Int. Cl.⁴ .................................... H01S 3/22
[52] U.S. Cl. ......................... 372/58; 372/85; 372/87
[58] Field of Search ............ 372/55, 58, 69, 83, 372/85, 87

[56] References Cited

U.S. PATENT DOCUMENTS

| | | | |
|---|---|---|---|
| Re. 29,103 | 1/1977 | Wilson et al. | 331/94.5 |
| 3,863,103 | 1/1975 | Eckbreth et al. | 372/58 |
| 4,058,778 | 11/1977 | Fahlen et al. | 372/85 |
| 4,096,449 | 6/1978 | Foster | 372/85 |
| 4,317,090 | 2/1982 | Nagai et al. | 372/58 |
| 4,342,115 | 7/1982 | Davis | 372/87 |
| 4,344,174 | 8/1982 | Spalding et al. | 372/55 |

FOREIGN PATENT DOCUMENTS

| | | | |
|---|---|---|---|
| 0064082 | 4/1983 | Japan | 372/55 |
| 0175180 | 10/1984 | Japan | 372/83 |
| 60-117790 | 10/1985 | Japan | |
| 0163678 | 7/1986 | Japan | 372/87 |

OTHER PUBLICATIONS

Appl. Phys. Lett. 48(8), Feb. 24, 1986, M. Kasamatsu and S. Shiratori, "New Bar Cathode System for cw CO₂ Traversely Excited Lasers", 505–507.

International Application Published under the Patent Cooperation Treaty (PCT), WO 82/01281, Apr. 15, 1982.

Primary Examiner—Frank Gonzalez
Assistant Examiner—B. R. R. Holloway
Attorney, Agent, or Firm—Foley & Lardner, Schwartz, Jeffery, Schwaab, Mack, Blumenthal & Evans

[57] ABSTRACT

A $CO_2$ gas laser device comprises a plurality of divided cathode electrodes disposed in a linear row extending transversely across a high-speed flow of a gas containing $CO_2$, and parts of the cathode electrodes producing negative glow are disposed at the same height as anodes at a downstream position. Additionally, a device for controlling the distribution of gas flow velocity, which functions doubly as means for creating turbulent flow, and a preliminary discharge electrode are disposed on the upstream side of the cathode electrodes, the former being set at a height position corresponding substantially to that of the middle portions of the cathode electrodes.

5 Claims, 2 Drawing Sheets

$CO_2$ GAS LASER DEVICE

This application is a continuation of application Ser. No. 021,850, filed Mar. 4, 1987.

BACKGROUND OF THE INVENTION

This invention relates generally to a $CO_2$ gas laser device and more particularly to a $CO_2$ gas laser device having a discharge excitation section provided with an improved configuration of a plurality of cathodes, a plurality of anodes, and a bar-shaped device for control of gas flow velocity distribution.

In general, in a $CO_2$ gas laser device of high output, a gas containing $CO_2$ is caused to undergo high-velocity circulation through a laser wind tunnel, and glow discharge is generated between positive and negative electrodes in a discharge excitation section. Resonator mirrors are provided at respective lateral sides of this discharge excitation section and cause laser light to be emitted.

In a typical $CO_2$ gas laser device known heretofore, however, a number of problems are encountered, one difficulty being restriction of the available electric intensity in the discharge excitation section at a low level. Another difficulty has been that of creating a turbulent flow velocity component of sufficient magnitude for generating a spatially uniform discharge in the discharge excitation section. Still another difficulty has been the complicated construction of the discharge section, which requires much time for fabrication and much work for electrode maintenance. These problems will be described more fully hereinafter with reference to drawings.

SUMMARY OF THE INVENTION

It is an object of this invention to provide a $CO_2$ gas laser device with a high output and efficiency.

According to this invention, there is provided a $CO_2$ gas laser device for generating laser light through glow discharge of a gas containing $CO_2$, generated between anode and cathode electrodes disposed opposite to each other, which comprises: a) a plurality of cathode electrodes having an upper part perpendicular to the gas flow, a horizontal middle part, and a lower part perpendicular to the gas flow and disposed upstream of circulating laser gas flow so as to cross the gas flow; b) a turbulence generating member having a rectangular cross section and disposed upstream of the center portions of the lower parts of the cathode electrodes and parallel to the cathode electrodes so as to cross the gas flow; and c) a plurality of anode electrodes disposed vertically and downstream of and opposite to the cathode electrodes so as to cross the gas flow.

The nature, utility, and further features of this invention will be more clearly apparent from the following detailed description with respect to a preferred embodiment of the invention when read in conjunction with the accompanying drawings, briefly described below.

Figure 6:
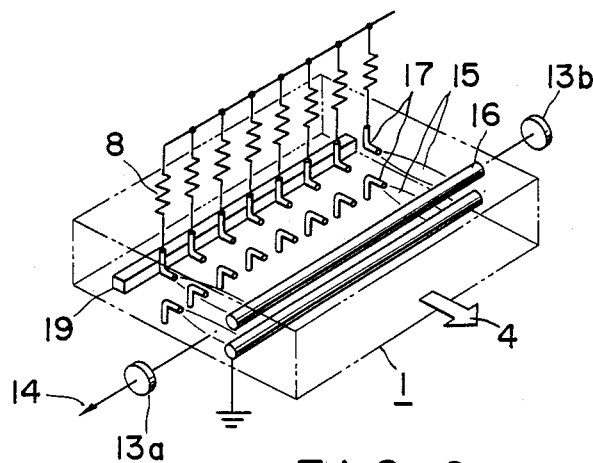
FIG. 6 is a view similar to FIG. 2 showing the discharge excitation section of a known $CO_2$ gas laser device.
Figure 7:
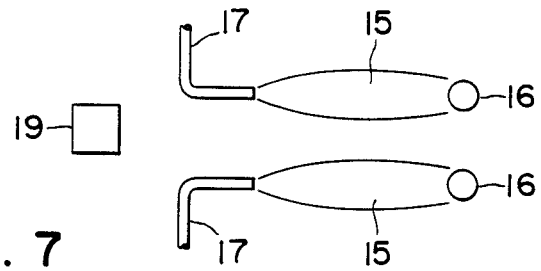
FIG. 7 is a diagrammatic, relatively enlarged, side view indicating the glow discharge of the device of FIG. 6.

As conductive to a full understanding of this invention, the general nature, limitations, and attendant problems of an example of a discharge excitation section in a conventional $CO_2$ gas laser device will first be described with reference to FIGS. 6 and 7.

Figure 4:
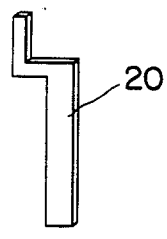
FIGS. 4 and 5 are other embodiments of a cathode electrode, respectively.

This discharge excitation section 1 is shown in the form of a segment of a gas duct or tunnel through which $CO_2$ gas flows as indicated by arrow 4 from the upstream side shown on the upper left side toward the downstream side on the lower right side as viewed in FIG. 4. In the interior of this section 1, a transverse zig-zag row of a plurality of pin-shaped cathode electrodes 17 and a transverse bar-shaped anode 16 are disposed in a parallel configuration in confrontal upstream and downstream positions, respectively. The anode 16 is of ground (earth) potential, and a high negative voltage is impressed on each cathode electrode 17 via a respective discharge stabilizing resistor 8.

On the upstream side of the cathodes 17 is provided a turbulent flow generating device 19 having a rectangular shape in section which functions to generate a suitable turbulence in the gas flow flowing into the section 1. On one lateral side of the anode 16 is provided a reflecting mirror 13b which functions as a resonator while on the other lateral side thereof is provided an output mirror 13a for transmitting laser light and directing it out of the resonator.

In a conventional $CO_2$ gas laser device having a discharge excitation section as described above, the cathode electrodes 17 are arranged in a zig-zag row in order to cause generating of glow discharge within the discharge space with as much uniformity as possible. However, as the glow discharge current increases, the negative glow area generated on the cathodes 17 increases in the upstream direction of the gas flow. As a consequence, as shown in FIG. 7, glow discharge 15 generated between the cathodes and the anode is divided spatially with respect to the respectively separate cathode electrodes, and portions of high electric intensity and portions of low electric intensity occur. Further, if an electric intensity in a high electric intensity portion is increased to exceed a certain value, the glow discharge is changed into arch discharge which increases the temperature of the gas. As a result, the occurrence of laser is stopped. In addition, if discharge power is not uniform, the maximum power just before the discharge is stopped is determined according to a position of a high electric intensity and output laser light does not become uniform which decreases efficiency.

Accordingly, by providing the turbulent flow generating device 19 on the upstream side of the cathode 17 to generate turbulent gas flow, the concentration of discharge is prevented. However, since the distal end of the cathode electrodes 17 is extended along the gas flow, a turbulent gas flow cannot be generated thereby to hinder the increase of the output of laser light.

Figure 1:
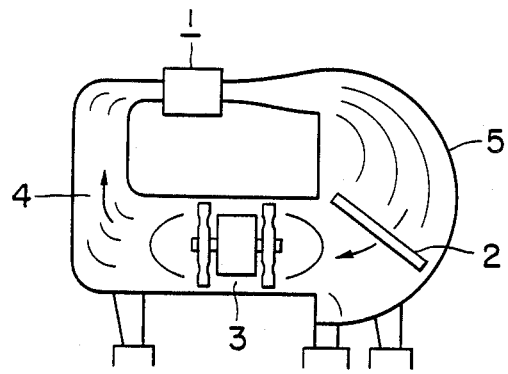
FIG. 1 is a schematic side view showing the essential structural organization of an entire $CO_2$ gas laser device in which this invention can be effectively applied.

These problems have been solved in the $CO_2$ gas laser device according to this invention, which will now be described more fully with respect to an example thereof as illustrated in FIGS. 1, 2, 3 and 4. As shown in FIG. 1, the entire laser device comprises essentially a laser wind tunnel 5, a discharge excitation section 1 at a constricted part of the wind tunnel 5, a fan and motor 3 disposed within the wind tunnel, and a heat exchanger 2 disposed within an expanded part of the wind tunnel between the discharge excitation section 1 and the fan 3. In the operation of this $CO_2$ gas laser device, a laser circulating gas 4 ($CO_2$, $N_2$, and He) containing $CO_2$ is cooled by the heat exchanger 2, then propelled at a velocity of the order of 50 m/sec. by the fan 3, and supplied at a high circulation velocity through the constricted discharge excitation section 1.

Figure 2:
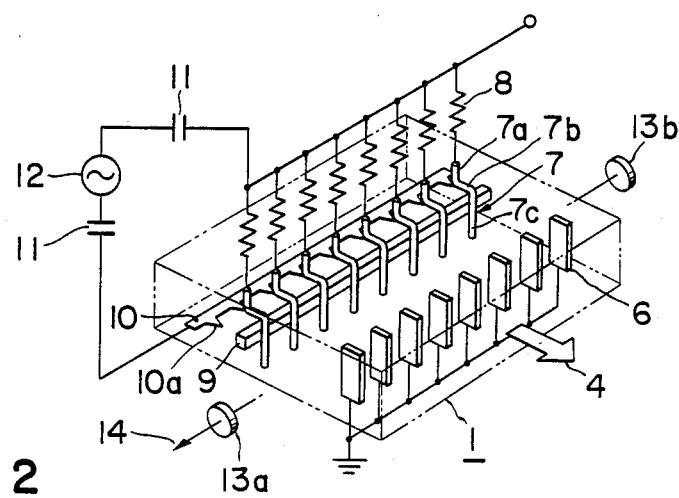
FIG. 2 is a schematic perspective view, including an electric circuit diagram, of one example of a discharge excitation section of the device according to the invention.

Within the discharge excitation section 1, the circulating gas flows as indicated by the arrow 4 in FIG. 2. In the interior of this section 1, at a downstream part thereof, a plurality of rectangular plate-shaped anode electrodes 6 of ground (earth) potential at their lower ends are disposed at suitable intervals in a straight row across the section 1 transversely to the gas flow. Upstream from this row of anodes 6 and at the same height level is provided a similar transverse row of a plurality of bar-shaped cathode electrodes 7 which are transversely disposed to oppose respective anode electrodes 6. A high negative voltage is impressed on each cathode electrode. Each cathode electrode 7 has a shape shown in FIG. 2 and the upper end of the cathode electrode 7 is fixed to an upper wall of the section 1. Each cathode electrode 7 comprises an upper part 7a perpendicular to the gas flow, a horizontal middle part 7b parallel to the gas flow, and a lower part 7c perpendicular to the gas flow. The lower part 7c is extended vertically from the down stream end of the horizontal middle part 7b and is relatively long in comparison with the other parts. A high negative voltage is impressed via a discharge stabilization resistor (ballast resistor) 8 on the upper part 7a of each cathode 7. Further, a device 9 in the form of a bar of square cross section for controlling the gas flow velocity distribution, that is, for generating turbulence gas flow is disposed transversely upstream of the center portions of the lower parts 7c of the cathodes 7. In addition, a preliminary discharge electrode 10 comprising a trigger electrode is disposed transversely at a position opposite to the lower end of each lower part 7c and is connected via condensers 11, 11, a high-frequency power source 12, and the above mentioned discharge stabilization resistors 8 to the upper parts 7a of the cathode electrodes 7. The preliminary discharge electrode 10 is of elongated plate or strip shape and has a plurality of projections 10a, 10a, ... 10a corresponding respectively to and pointing toward the cathode electrodes 7.

On the opposite lateral sides of the discharge excitation section 1, a reflecting mirror 13b and an output mirror 13a are respectively provided to function as light resonators.

Figure 3:
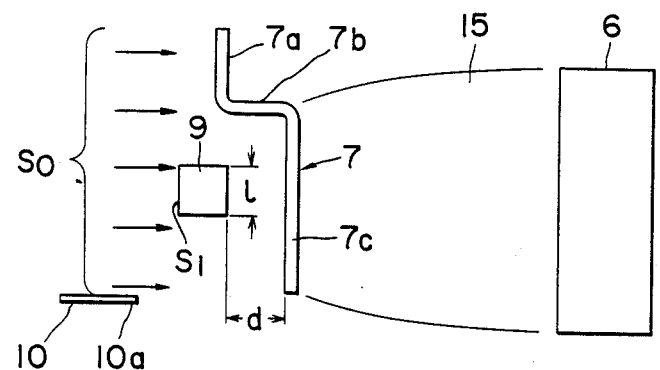
FIG. 3 is a diagrammatic, relatively enlarged, side view indicating the configural relationships between a cathode electrode, a device for controlling flow velocity distribution, and a preliminary discharge electrode.

The positioning and dimensions of the above mentioned flow velocity distribution control device 9 are important features of this invention. As indicated in FIG. 3, this square bar 9 is disposed transversely across the gas flow at a height which corresponds approximately to the center of the middle part of the lower parts 7c of the cathode electrodes 7 and at a distance d of from 0.5 to 5 cm upstream from the lower parts 7c. The relationship between this distance d and the dimension l of the cross section of the square bar 9 perpendicular to the gas flow is so selected that l will be in the range of from d to $\frac{1}{4}$d ($d \geq l > \frac{1}{4}d$). Furthermore, the relationship between the total cross-sectional area $S_0$ of the stream of gas flowing through the section 1 and the area $S_1$ of one surface of the square bar 9 perpendicular to the direction of the gas flow is so selected that $S_l$ will be 10 to 25 percent of $S_0$.

Since the upper part 7a of each cathode electrode 7 is positioned further upstream relative to its lower part 7c, the cathode-anode distance at the portion of the upper part 7a is greater than the cathode-anode distance in the vicinity of each cathode lower part 7c which generates glow discharge during operation.

The $CO_2$ gas laser device with the discharge excitation section of the above described construction according to this invention operates in the following manner. At the time of starting of discharge, a high-frequency preliminary discharge of low current is first generated between the plurality of cathode electrodes 7 and the projections 10a of the preliminary discharge electrode 10. Even though the preliminary discharge electrode 10 is in the form of a single unitary structure, the discharge is not concentrated at one region. Because a discharge stabilization resistor 8 is connected to each of the cathode elements 7. It is necessary to hold the capacitive impedances 11 at a low value so as to prevent the generation of a steady negative glow above the cathode thereby to prevent it from influencing the main discharge.

Then, when a high current is supplied from a high-voltage power source (not shown) to the cathode 7, a negative glow is generated on the cathode surfaces. Because of the shielding effect with respect to the gas stream of the flow velocity distribution control device 9 at this time, the flow velocity in the vicinity of the cathode at a height corresponding to the center of the lower part 7c of the cathode 7 is less than that at other parts. For this reason, the number of charged particles swept away by the gas stream in the vicinity of the cathode becomes relatively small, whereby the negative glow is ignited from the center of the lower portion 7c of the cathode 7.

As stated hereinbefore, it is necessary that the distance d between the cathode 7 and the velocity distribution controlling device 9 be from 1 to 4 times the cross-sectional dimension l of the controlling device 9 perpendicular to the gas flow direction. We have found that, if the distance d is below this range, the flow velocity distribution in the glow discharge generating region will assume a state wherein the velocity at the center portion of the lower part 7c of the cathode 7 is excessively low to decrease the maximum impregnating power. On the other hand, if the distance d is above this range, the flow velocity in the vicinity of the cathode cannot be lowered sufficiently, and, in the case where the glow discharge current is low, the discharge will shift unstably over the cathode, whereby the stability of the output laser light will decrease.

In the $CO_2$ gas laser device of this invention, the glow discharge is generated at the center portion of the lower part 7c of the cathode 7. For this reason, a stable discharge can be realized even at the time when the laser light begins to oscillate, that is, at the time of low current (so-called shimmer current).

Further, since the lower part 7c of each cathode electrode 7 is disposed opposite to each anode electrode 6 and each cathode electrode 7 and each anode electrode 7 are disposed parallel to each other, original positions of discharge are expanded from the center positions of the anode and cathode electrodes 6, 7 toward their upper and lower positions. For this reason, local increase of the discharge electric intensity as in a conventional zigzag electrode arrangement does not occur. As a result, the mean and stable discharge electric intensity which can be introduced is considerably improved without occurrence of discharge concentration as shown in FIG. 3. Therefore, the power to be impressed can be increased.

The number of the aforedescribed cathode electrodes in the device of this invention is of the order of ⅓ or less of the conventional number. Accordingly, the number of the discharge stabilization resistors 8 is also reduced and assembly and the maintenance of this device become easy.

In the above embodiment, the preliminary discharge electrode 10 is provided. However, the electrode 10 is not necessarily provided in order to attain the object of this invention.

FIG. 4 shows another embodiment of the above cathode electrode. A cathode electrode 210 in FIG. 4 is in the form of a plate. In this electrode 210, even if the igniting area for negative glow discharge is the same as that of the above bar-like cathode electrode 7, the resistance against gas flow can be decreased by thinning the thickness of the plate.

Figure 5:
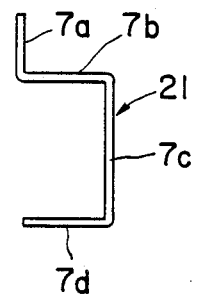

FIG. 5 shows still another embodiment of the above cathode electrode 7. A cathode electrode 21 has a lower horizontal part 7d extended from the lower end of the lower part 7c toward the upstream side. In this case, the generating area for negative glow discharge is increased and further discharge area can be restricted so as not to expand until the upper part 7c even if other gases are mixed with laser gas thereby to change glow discharge into arch discharge.

In the embodiment, the turbulence generating bar 9 has a square shape. However, it may have a rectangular shape in cross section. Further, it may have a hexagonal shape. In this case, the relationship between the distance d and the dimension l of the turbulence generating bar may be slightly changed. The number of the bars may be two. In this case, the two bars may be disposed separately at upper and lower positions. The anode electrode 6 may be in the form of a bar if it has a certain vertical length for forming position for discharge and a small resistance relative to gas flow.

By the structural organization of the device of this invention as described above, the number of divided cathode electrodes is reduced, and, moreover, the discharge starting characteristics are improved. In addition, the discharge electric intensity which can be introduced is improved from 2 to 3 times that of a conventional device, and the distribution of the laser light intensity is improved with high output and high efficiency.

What is claimed is:

1. A $CO_2$ gas laser device for generating laser light through glow discharge of a gas containing $CO_2$ generated between anode and cathode electrodes disposed opposite to each other in a resonant cavity for circulating laser gas flow, the glow discharge being coaxial with the gas flow comprising:
   (a) a plurality of cathode electrodes disposed in a row extending across upstream of the gas flow, each of said cathode electrodes having a first portion extending transverse to the direction of the gas flow, a second portion extending transverse to the direction of the gas flow and offset transverse from said first portion of the cathode electrodes, said second portion being disposed downstream of said first portion with respect to said gas flow, and third portion mutually connecting adjoining ends of said first and second portions,
   (b) a turbulence generating member having a rectangular cross section and disposed upstream of the center portions of the second portion of the cathode electrodes at an appropriate distance and parallel to the cathode electrodes so as to cross the gas flow; and
   (c) a plurality of anode electrodes disposed transverse to the direction of the gas flow, parallel to the second portion of the cathode electrode, and downstream of and opposite to the cathode electrodes so as to cross the gas flow.

2. A $CO_2$ gas laser device according to claim 1 in which a preliminary discharge electrode is disposed on the upstream side of the cathode electrodes in order to generate a preliminary discharge between the cathodes and the preliminary discharge electrode.

3. A $CO_2$ gas laser device according to claim 1 in which said turbulence generating member is in the form of a bar of square cross section and the distance between said turbulence generating member and the cathode electrodes is made 1 to 4 times the width in cross section of said turbulence generating member.

4. A $CO_2$ gas laser device according to claim 1 in which each of the cathode electrodes is in the form of a late having a rectangular cross section.

5. A $CO_2$ gas laser device according to claim 1 further comprising a fourth portion extending in an upstream direction with respect to the gas flow from the end of the second portions, remote from the end thereof connected to the third portion.

* * * * *